(12) United States Patent
Jenkins

(10) Patent No.: US 6,295,658 B1
(45) Date of Patent: *Oct. 2, 2001

(54) FLOOR-MAT SYSTEM

(76) Inventor: Matthew Jenkins, 6633 Balfour Ave., Allen Park, MI (US) 48101-2300

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/977,330

(22) Filed: Nov. 24, 1997

(51) Int. Cl.$^7$ ....................................................... E03D 11/00
(52) U.S. Cl. ............................................................. 004/251.1
(58) Field of Search ................................. 4/251.1, 251.2, 4/301

(56) References Cited

U.S. PATENT DOCUMENTS

| | | |
|---|---|---|
| D. 134,684 | 12/1942 | Samuels . |
| 1,633,951 | 6/1927 | O'Toole . |
| 1,641,029 | 8/1927 | Gaudet . |
| 2,057,162 | 10/1936 | Richey . |
| 2,187,676 | 1/1940 | Biewen . |
| 2,771,613 | 11/1956 | Markiewicz . |
| 4,125,656 | 11/1978 | Creamer . |
| 4,285,075 | 8/1981 | Nelson . |
| 4,328,275 | 5/1982 | Vargo . |
| 4,609,580 | 9/1986 | Rockett . |
| 4,876,135 | 10/1989 | McIntosh . |

*Primary Examiner*—Charles E. Phillips
(74) *Attorney, Agent, or Firm*—John R. Benefiel

(57) ABSTRACT

The system comprises a disposable pad having a plurality of layers, and means for retaining the disposable pad either upon the upper surface of a permanent base or directly onto the floor. The permanent base is positioned upon the floor and the base has an upper surface that is generally horizontal. The disposable pad includes a layer of absorbent material, and a coating layer of waterproof material. The pad is flame retardant and biodegradable. The system is useful for keeping the floor dry and in a sanitary condition. The undersurface of the disposable pad includes two bores for cooperative engagement with two projections extending upwardly and affixed to the floor.

7 Claims, 8 Drawing Sheets

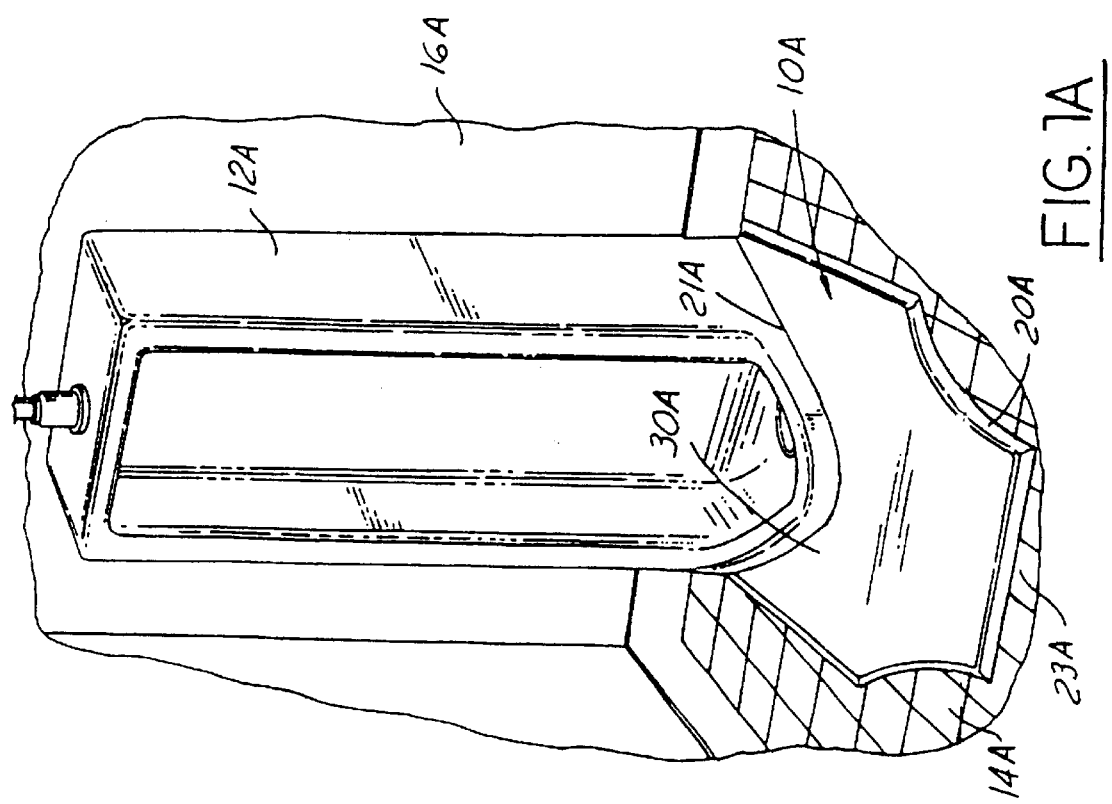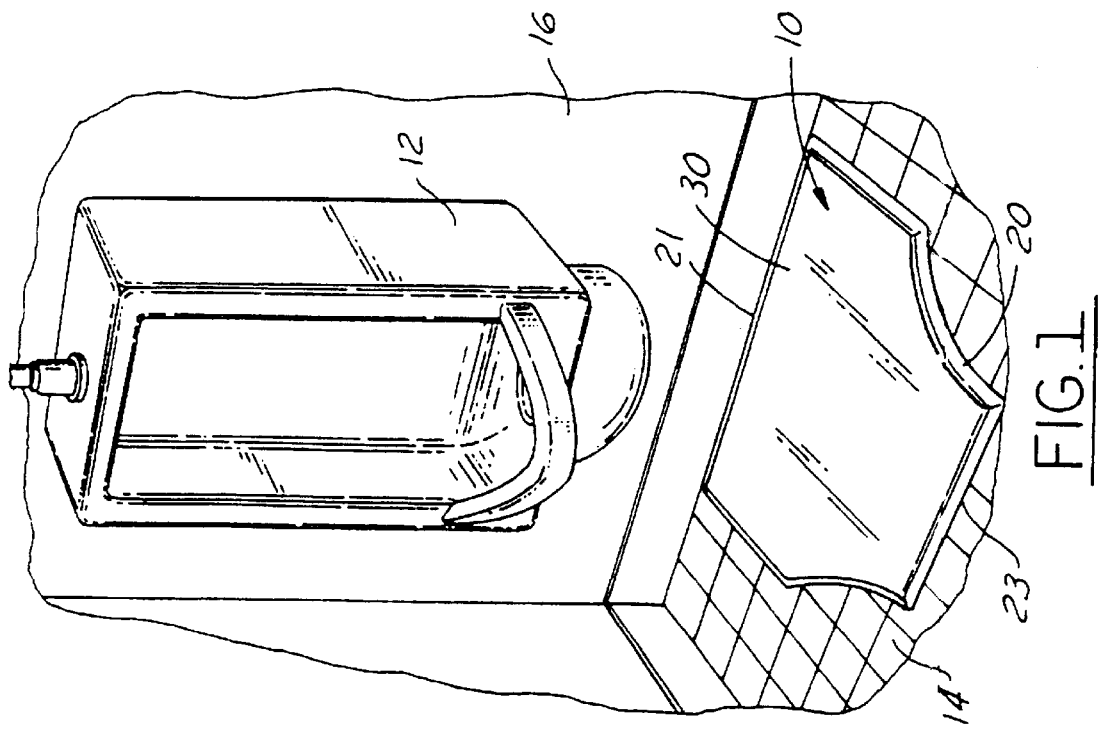

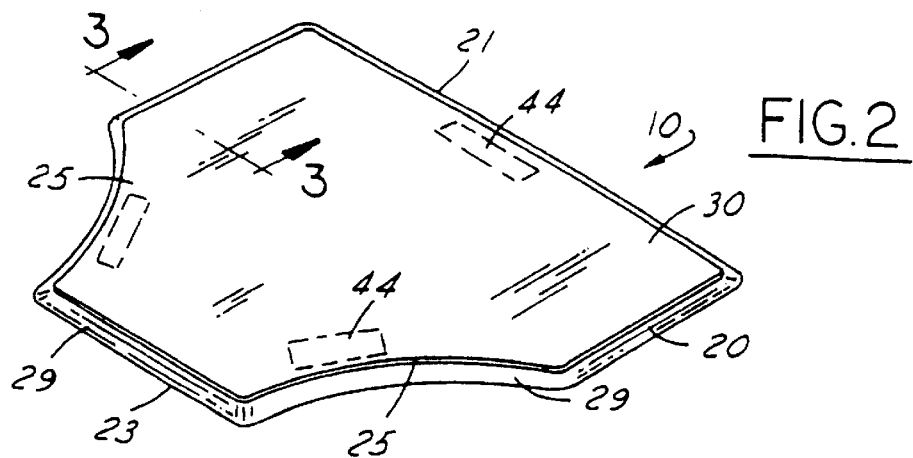
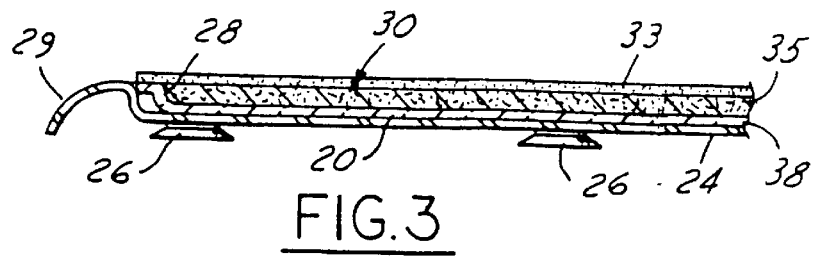
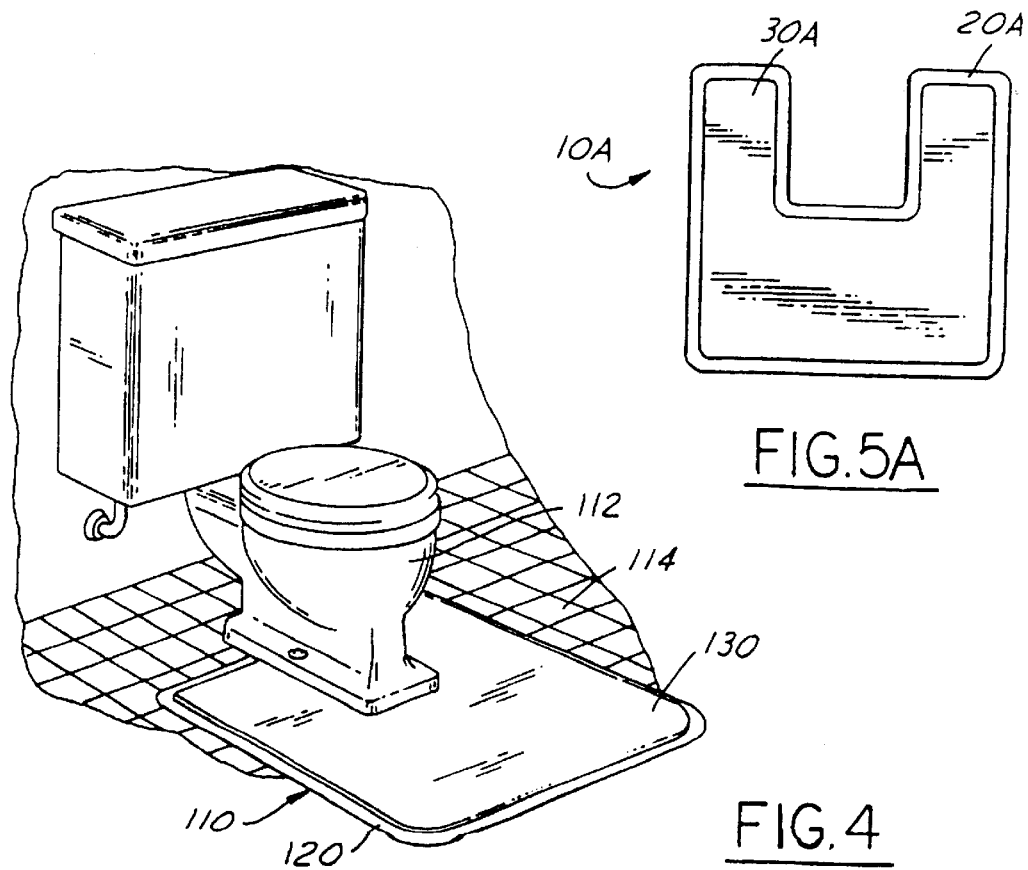

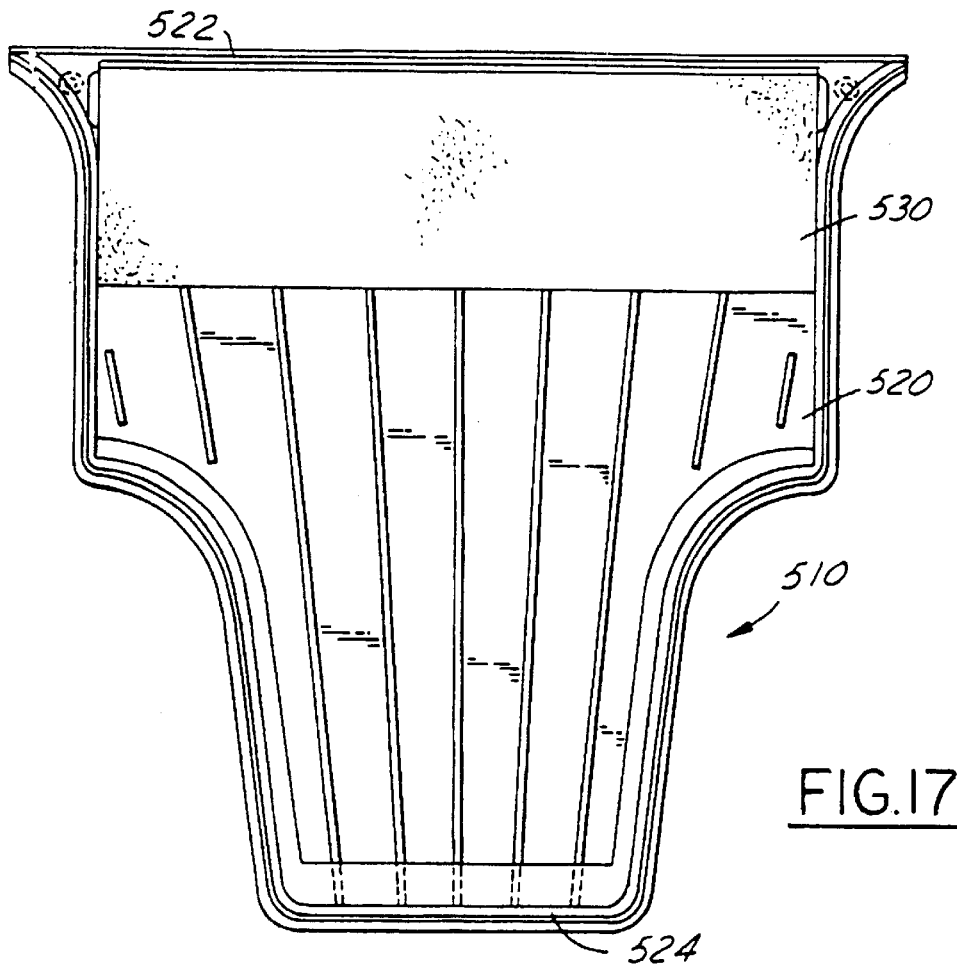
FIG. 17
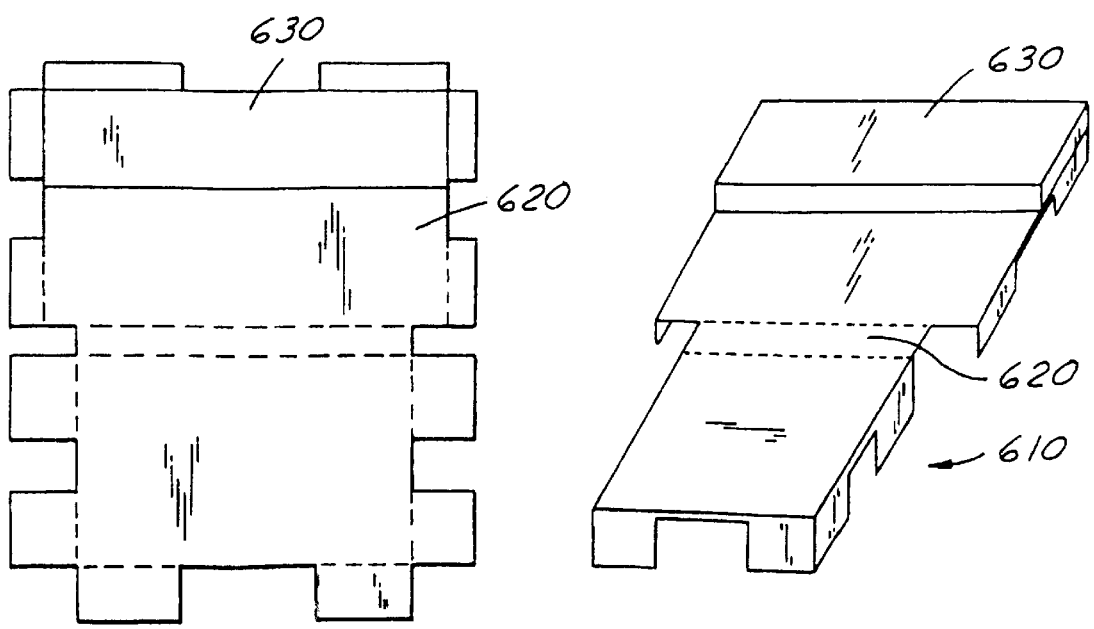
FIG. 19
FIG. 20

FLOOR-MAT SYSTEM

FIELD OF USE

The present invention relates to a floor mat system for maintaining a portion of a floor in a clean and sanitary condition, and more particularly, a system for particularly useful in public restrooms for keeping the floor sanitary, preserving the floor from aging and cracking, and preventing offensive odors.

BACKGROUND OF THE INVENTION

Public restrooms are too often unsanitary, unsightly, and contain odorous deposits of urine. In addition to the foul odors, people using the restrooms often walk through such matter, thereby contaminating their shoes and spreading such matter throughout the restroom and in nearby hallways and common areas. The problem is particularly acute in public restrooms having urinals for men, and in rest homes and hospitals where the elderly or others with physical disabilities use the restroom facilities. Also, the problem of maintaining sanitary conditions for household pets has never been satisfactorily resolved.

The following references are pertinent:

U.S. Pat. No. 2,057,162 (Richey) discloses a water-absorbent mat comprising a single ply of sheet material, and a moisture-proof backing, the mat having a semicircular opening to fit around a lavatory, and a pair of cords to secure the mat to the lavatory.

U.S. Pat. No. 2,187,676 (Biewen) discloses an absorbent floor mat rectangular in shape with a cut-out portion to fit about a toilet. The floor mat is made of an absorbent material and impregnated with a suitable deodorizing or disinfectant material.

U.S. Pat. No. 2,771,613 (Markiewicz) discloses a pear-shaped floor protecting mat made of a flexible absorbent material that is washable. The mat includes an opening disposed therein and fits tightly about the base of a toilet bowl.

U.S. Pat. No. 4,125,656 (Creamer) discloses an absorbent pad adapted to be formed into a U-shaped configuration and placed about the front side of a toilet base to absorb moisture gravitating downward. The pad is adjustable and suitable to fit about toilet bases of different configurations.

U.S. Pat. No. 4,285,075 (Nelson) discloses a sanitary commode mat comprising a mat cover designed to fit snugly around the base of a commode. The mat includes a hinged mat cover wherein an absorbent pad is placed. To replace the pad, one must lift the contaminated top grille of the mat, remove the pad and replace it with a clean pad, and close the cover.

U.S. Pat. No. 4,876,135 (McIntosh) discloses a floor mat with disposable absorbent cardboard pad for use in automobiles or as a door mat.

None of these configurations have found market acceptance. In addition, when absorbent materials are used that are flammable, what was an unsanitary condition has been converted into a dangerous one.

What is needed is a system for public, semi-private, and residential restrooms that will simplify and improve the sanitary maintenance of such restrooms. The system will include a disposable pad that is not only flame-retardant but also is biodegradable and not pose any danger to the environment. A system is needed that will enable businesses to maintain sanitary and attractive restroom facilities for their patrons, while not posing a fire hazard.

SUMMARY OF THE INVENTION

However, while it is understood that the principles of the present invention have numerous other applications, the floor mat system will hereinafter be described with reference to urinals in men's public restrooms for purposes of illustration only.

The system of the present invention provides a sanitary and cost-effective solution to the aforementioned problems by absorbing the urine before it reaches the restroom floor, thereby preventing any accumulation of the matter on the restroom floor, and preventing the floor from becoming slippery causing a possible safety hazard. The system also prevents the spread of bacteria and odors associated with the urine throughout the restroom and beyond and onto the shoes of the patrons, and prevents damage to the floor and grouting about the commodes from the damaging and corrosive effects of the acid common in urine.

The preferred embodiment of the system of the present invention comprises a permanent base member, a disposable diaper-type pad, and means for retaining the disposable pad upon the upper surface of the permanent base member. The disposable diaper-type pad is positioned onto the base member in a restroom about a urinal used by men to protect the floor from the harmful, unsanitary, and corrosive effects of urine.

The permanent base member is disposed upon the floor of the restroom and adjacent to the commode. The base member has an upper surface that is generally horizontal.

The disposable pad includes a layer of liquid-absorbent material, and the layer of absorbent material is one of a plurality of layers. The pad is preferably made of a flame-retardant material, and is replaced on a regular or daily basis. When the pad is used with a urinal as commonly found in a restroom used by men, it is broader at one end and narrower at the other. The broader end abuts the wall beneath the urinal, and the narrower end opposes the broader end.

Since the materials listed above for the absorbent pad are biodegradable, it is highly desirable to make the waterproof coating also biodegradable, so that disposal of large quantities of the pads will not be a hazard to the environment.

The disposable pad is made of biodegradable materials. The waterproof bottom layer has either a paraffin-wax coating, or a "Scotchgard"™-type chemical may be applied to the underside of the pad, locked the moisture into the pad.

The means for retaining the disposable pad to the base member is tape disposed on the undersurface of the pad, and having an adhesive surface that adheres to the upper surface of the base member or directly onto the floor.

The disposable pad may be applied directly to the floor without the base member. The tape disposed on the back of the pad is applied directly to the floor abutting the wall underneath the commode.

For a more complete understanding of the floor mat system of the present invention, reference is made to the following detailed description and accompanying drawings in which the presently preferred embodiments of the invention are shown by way of example. As the invention may be embodied in many forms without departing from spirit of essential characteristics thereof, it is expressly understood that the drawings are for purposes of illustration and description only, and are not intended as a definition of the limits of the invention. Throughout the description, like reference numbers refer to the same component throughout the several views.

BRIEF DESCRIPTION OF THE DRAWINGS

FIG. 1 is an environmental view of the floor mat system of the present invention for use with a conventional urinal found in public restrooms for men;

FIG. 1A is an environmental view of the floor mat system of the present invention for use with another type of urinal commonly found in restrooms for men;

FIG. 2 is an assembly view showing the floor mat system of FIG. 1, the system comprising the disposable floor mat, the base member, and means for securing the pad to the base member;

FIG. 3 is a sectional view of the floor mat system of the present invention, the section being taken through 3—3 of FIG. 2;

FIG. 4 is a second environmental view of the floor mat system of the present invention for use with a conventional toilet;

FIG. 5A is a top view of the floor mat system of the present invention shown in FIG. 4;

FIGS. 17 and 18 disclose yet another preferred embodiment of the floor mat system of the present invention for use with a conventional urinal;

FIGS. 19 and 20 disclose a disposable restroom floor mat of the present invention for use with a conventional urinal, the floor mat being generally in the shape of an unfolded box for purposes of compact storage;

DETAILED DESCRIPTION OF THE PREFERRED EMBODIMENTS

Figure 5B:
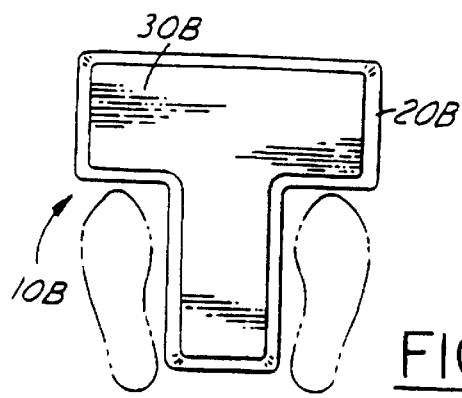
FIG. 5B discloses a floor mat system of the present invention having a generally T-shaped configuration.

The floor mat system of the present invention has many applications in public restrooms, but will be described herein with reference to urinals in men's restrooms for purposes of illustration only.

Referring now to the drawings, the system [10] of the present invention as shown in FIG. 1 is useful for keeping the floor [14] about the commode [12] in a sanitary condition. A commode as used herein includes a urinal, a latrine, a toilet, and any other fixture generally found in either a public or private restroom for the disposing of urine. However, for purposes of illustration only, a urinal as is commonly found in restrooms for men will be used herein.

The first preferred embodiment of the system [10] comprises a permanent base member [20], a disposable pad [30], and means [44] for retaining the disposable pad [30] upon the upper surface of the permanent base member [20]. The permanent base member [20] is disposed upon the floor [14] of the restroom adjacent to the commode [12]. The base member [20] has an upper surface [22] that is generally horizontal.

The base member [20] is reusable and is preferably low and close to the ground, so that people will not trip over the base member [20]. Also, the edges [24] of the base member [20] include a beveled edge [29] to further prevent any such tripping.

The base member [20] is made from a rubber-like, impermeable material, such as polyvinyl-chloride, and is preferably Sanoprene, a registered trademark of Roush Industries, or a PVC-75 Koreseal (registered trademark), and is commercially available from the RJF International Corp. The base member [20] has a non-skid undersurface [24] to retain the base member [20] in a fixed position relative to the floor [14]. The undersurface [24] of the base member [20] includes rubber skids [26] that increase the friction component of the base member [20] relative to the floor [14]. The base member [20] has a substantially horizontal upper surface [28] for retaining the disposable absorbent pad [30] thereon.

The base member [20] is positioned directly under and centered relative to the urinal [12], abutting the wall [16] under the urinal [12]. While the forward edge [21] of the upper surface [28] of the base member [20] underneath the urinal [12] is broad, such breadth is undesirable for a man using the urinal [12] who wants to avoid stepping on the pad [30] or tripping on the base member [20]. Hence, the rearward edge [23] of the upper surface [28] of the base member [20] is narrow, thereby enabling the man using the urinal [12] to place one foot on either side straddling the base member [20] and the pad [30].

FIG. 1A disclosed another type of urinal [12A] that extends to the floor [14]. The outer perimeter of the urinal may be rounded as shown as depicted in FIG. 1A, have the general shape of a "V" with the lower portion truncated (similar to the shape of the rearward surface of the system [10C] shown in FIG. 5B). The outer perimeter of the urinal may also have the general shape similar to the rearward portion of the system [10] shown in FIG. 1, or even be squared. The forward edge [21A] of the base member [20A] and the pad [30A] as already described above abut the wall [16] adjacent to the urinal, and also the urinal [12A] to minimize any gap therebetween. Also the rearward edge [23] of the base member is slightly elevated relative to the forward edge [21] so that any moisture depositied thereon will gravitate toward the pad {30A].

As shown in FIG. 3, the disposable pad [30] comprises an upper protective layer [33], an absorbent layer adjacent [35] to the upper protective layer [33], and a waterproof bottom layer [38]. The shape of the pad [30] is the same as the shape of the upper surface of the base member [20].

The disposable pad [30] is a high-performance, heavyweight, fluff-filled underpad with a super-absorbent polymer, and is commercially available from the Hospital Supply Company and used in hospital beds to keep them dry. The absorbent layer [35] is white spunbonded, and the waterproof coating [38] is green polypropylene with a flat seal. The absorbent layer has rewet properties, internal method D-3004-D, 0.5 psi pressure, with a 1.0 saline solution, involving a five-minute dunk, and a one-minute drain. The amount of super-absorbent polymer in each absorbent pad [30] can be adjusted periodically to increase or decrease the amount of super-absorbent polymer, thereby maximizing the effectiveness of the product.

The protective layer [33] is a white spunbonded or nonwoven pad [30] of about 18 grams per square meter, and serves to protect the absorbent layer [35]. The protective layer [33] of the disposable pad [30] is treated with flame-retardants, either Thermoguard™ or Pyronil™. Thermoguard™ is commercially available from Atochem North America, and Pyronil™ is commercially available from Elf Atochem of North America. "Pyronil™ 45" is a flame retardant additive that may even be blended with other flame retardants.

Thermoguard™ contains 90% thermoguard S antimony oxied in low density polyethylene. The chemical name for Pyronil™ is D1-2-ethylehxyl tetrabromo-phthalate with 45% bromine.

The absorbent layer [35] is a super absorbent polymer core material. The material is commercially available from the Chemdal Corporation in Palatine, Ill., under the trade name Aridall™ 128, is a thermal bonded web comprising a fluff pulp, bonding fibre and superabsorbent polymer. The absorbent layer [35] is a superbonded thermal unit that will not break down when wet. The pad [30] has an absorbency of at least ten times its own weight.

Another disposable pad [35] is a thermally bonded web comprising a fluff pulp, bonded fiber and superabsorbent fiber, being commercially available from the Walkisoft USA, Inc., of Mt. Holly, N.C. with a product code of 500.382.

The impermeable bottom layer [38] is a green polypropylene waterproof backing material that retains moisture, preventing seepage onto the floor [14] of the restroom. A waterproof embossed polyethylene material may also be used.

Since the materials listed above for the absorbent pad [35] are biodegradable, it is highly desirable to make the waterproof coating [38] also biodegradable, so that disposal of large quantities of the pads [30] will not be a hazard to the environment.

Preferably, a paraffin-type coating is used, having a nonwoven or jute (burlap) material having a paraffin-wax coating. The coating [38] will be waterproof, and biodegradable.

The coating [38] is commercially available from the International Group, Inc. of Agincourt, Ontario Canada, and is "Parafflex 4775," a blend of wax and polymers specifically designed for saturating fabrics and paper. The material is chemically stable and is sprayed onto the bottommost layer of the pad [30].

Also, another type of biodegradable coating [38], instead of the paraffin-wax coating, involves a "Scotchgard™"-type of fabric protection by way of chemical application to the bottom of the pad [30], locking in the moisture and preventing it from escaping. The ingredients include naphthol spirits, carbon dioxide, haptene, 1-methoxy-2, propyl acetate, and fluoraoliphatic resin.

Figure 5C:
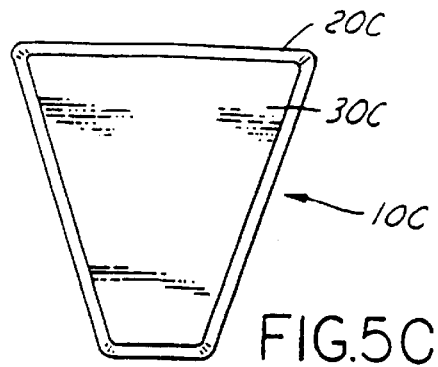
FIG. 5C discloses a floor mat system of the present invention having a generally triangular-shaped configuration.

The preferred shape of the base member [20] and the pad [30] as shown in FIG. 1 is generally T-shaped, except that the two side edges [25] abutting the rearward edge [23] are symmetrical and arcuate. FIG. 5A shows a U-shaped base member [20A] and pad [30A] for use with a conventional commode. The base member [20B] and the pad [30B] may also have a conventional T-shape as shown in FIG. 5B, or the base member [20C] and the pad [30C] may also have a triangular shape as shown in FIG. 5C.

Two-sided tape [44] is preferably permanently attached and disposed on the undersurface [39] of the impermeable bottom layer [38] of the pad [30]. The other surface of the tape [44] includes lift-off paper. The tape [44] is refastenable and reusable, and is similar to the tape [44] commonly used on baby diapers. The tape material is preferably two-piece polypropylene as commercially sold by the 3M Company, with anchored finger lift feature and silicone treated. The tape [44] retains the pad [30] in place onto the base member [20], or alternatively, directly to the floor [14] beneath and abutting the wall [16], or for those urinals that extend to the floor [14], the pad [30] abuts the urinal [12] on the floor [14]. Velcro hook-and-loop-type fasteners may also be used.

One strip of the tape [44] is preferably disposed for engagement with the center of the forward edge [21] of the base member [20], and two additional strips of the tape [44] are symmetrically disposed, one along the perimeter for engagement with each arcuate edge [25] of the base member [20] as shown in FIG. 2.

The edges [39] of the layers of the disposable pad [30] are heat treated and bonded together to prevent leakage by a thermal seal. The layers may also be secured together by a strip of waterproof material disposed about the perimeter of the layers and retained thereto by a stitch seam.

The pad [30] is impregnated with deodorizing and disinfecting materials. The super-absorbent polymer will neutralize the ammonia and will reduce odors.

Figure 6:
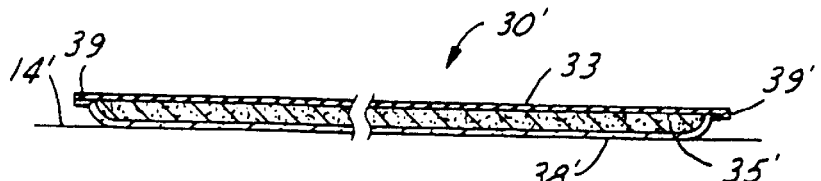
FIG. 6 is a sectional view of yet another preferred embodiment of the floor mat system of the present invention, comprising a two-layer disposable pad.

FIG. 6 discloses another embodiment, which involves the use of the disposable pad [30'] without the base member [20], the pad [30'] being essentially identical in shape and content to the pad [30] of the first embodiment, and applied directly to the floor [14']. The tape [44'] disposed on the back of the pad [30'] is applied directly to the floor [14'] abutting the wall [16'] underneath the commode.

Figure 7:
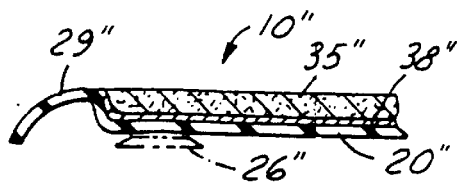
FIG. 7 is a sectional view of another preferred embodiment of the floor mat system of the present invention having two layers and a base member.

FIG. 7 discloses yet another embodiment of the restroom floor mat system [10"] of the present invention. which involves the base member [20"] and the disposable pad [30"] wherein the pad [30"] includes only two layers, an upper absorbent layer [35"] and a waterproof bottom layer [38"]. Again, the pad [30"] is essentially identical in shape and content to the pad [30] of the first embodiment.

For those commodes that extend down to the floor [14], the pad is arcuately shaped, and abuts the commode. For those trough-type urinals that are found in restrooms for men that are common in sporting arenas, it is preferred that an elongated pad extend beneath and parallel to the trough.

Figure 8:
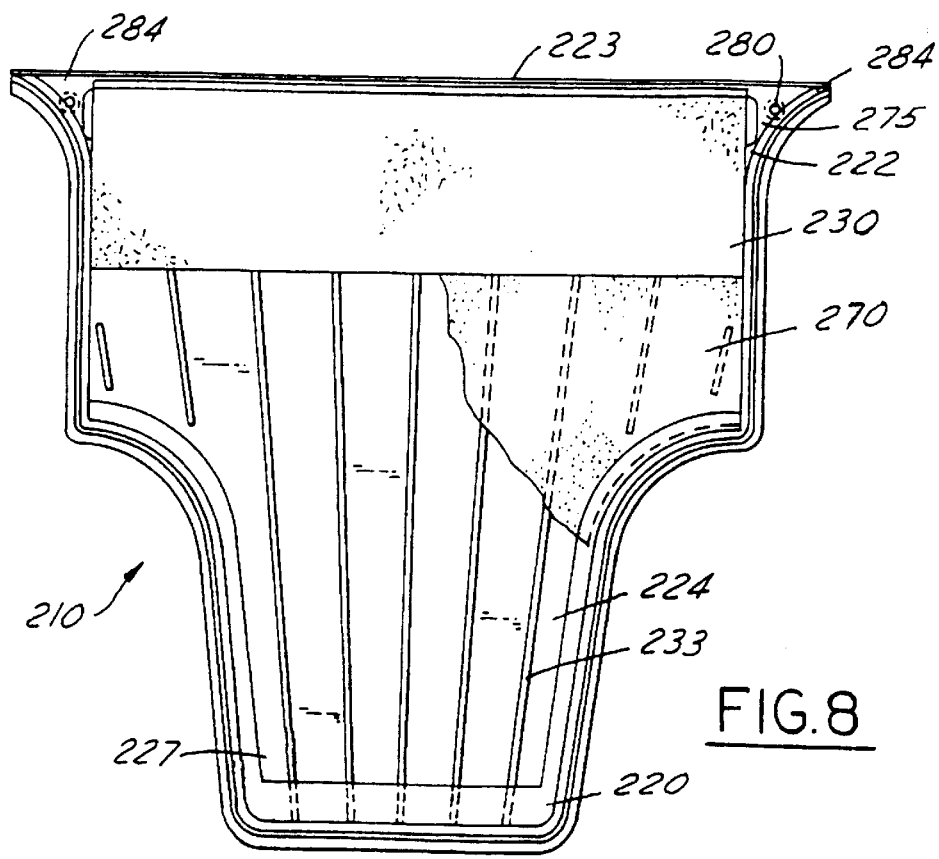
FIG. 8 is a top view of another preferred embodiment of the floor mat system of the present invention for use with a conventional urinal.
Figure 9:
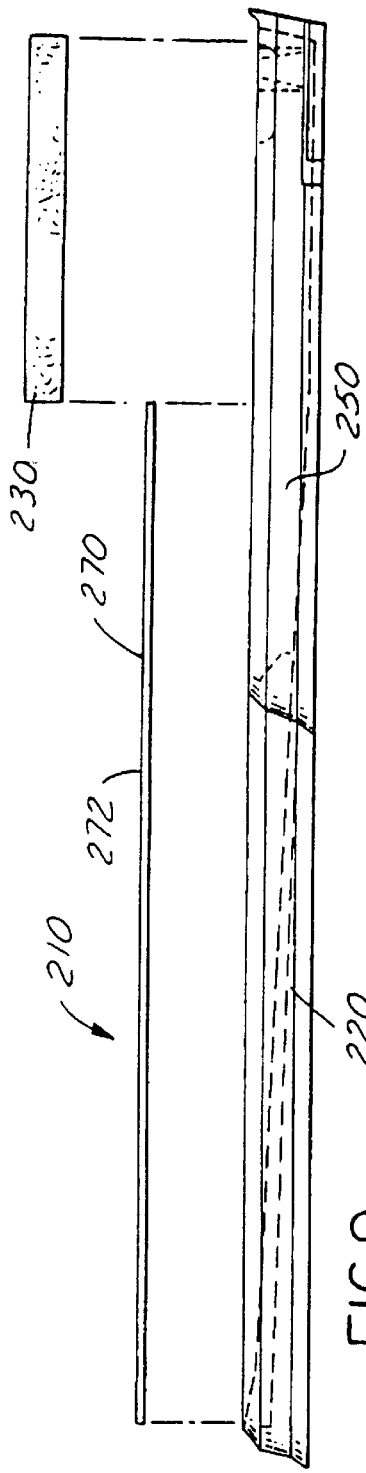
FIG. 9 is a side view of the base member, the nonabsorbent flat member, and the absorbent pad of the floor mat system of FIG. 8.

The floor mat system disclosed in FIGS. 8 and 9, discloses yet another preferred embodiment of the restroom floor mat system [210] of the present invention.

The restroom floor mat system [210] comprises a permanent base member [220], a disposable absorbent pad [230] that covers only the forward portion [222] of the base member [220], and means [44] for retaining the base member [220] relative to the floor [14].

The rearward portion [224] of the base member [220] includes a slight grade extending downwardly toward a pad-retaining compartment [250] disposed in the forward portion [222] of the base member [220], so that any moisture deposited in the rearward portion [224] will gravitate toward the pad-retaining compartment [250]. Also, the base member [220] has a slight grade inwardly in a symmetrical manner from both side edges (not shown) so that the moisture deposited thereon will gravitate toward the center portion of the base member [220] and downwardly toward the forward portion [220] and into the pad-retaining compartment [250].

The forward portion [222] of the base member [220] is lower than the rearward portion [224]. The forward edge [223] of the forward portion [222] abuts the planar wall [16] and is centered beneath the urinal [12], enabling any excess moisture running off the wall [16] to run onto the absorbent pad [230], and not the floor [14]. The base member [220] is generally T-shaped, the rearward portion [224] being symmetrical about an axis normal to the wall [16] and tapering away from the wall [16] in a curvilinear manner. An angled ledge [240] is beveled extending about the perimeter [242] of the base member [220]. The angled ledge [240] slopes inwardly directing moisture onto the absorbent pad [230]. The bottom [229] of the outside of the base member ledge [240] flairs outwardly providing improved traction. The base member [220] surrounding the pad-retaining compartment [250] preferably is vertical to retain the absorbent pad [230] and any excess moisture.

Figure 10:
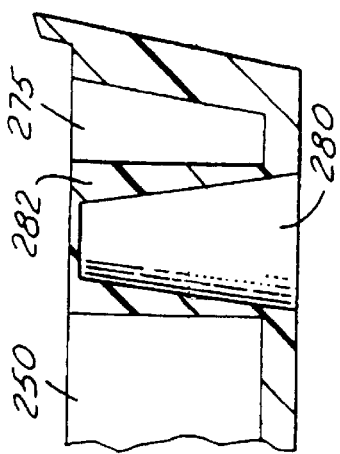
FIG. 10 is an exploded side detail of the floor mat system of FIG. 8, detailing the engagement between the lip extending about the perimeter of the rearward portion view of the base member and the nonabsorbent flat member.

Underneath the angled ledge [240] is an inwardly extending recess [255] disposed about the perimeter [242] to retain a nonabsorbent flat member [270] as shown in FIG. 10. The nonabsorbent flat member [270] is preferably made of a chipboard-like material, the upper surface [272] having a waxed coating (similar to the coating on a carton of milk), so that moisture deposited upon the upper surface [222] is not absorbed into the chipboard-like material. The undersurface surface of the nonabsorbent flat member [270] may also include a waxed coating, so that moisture coming into contact therewith is not absorbed into the chipboard-like material. The waxed coating on the chipboard-like material also includes a fire-resistant compound to comply with 16 CFR.

A flame-retardant, water-resistant topcoat of 1.2 to 1.5 millimeters for the chipboard pad coating of R32-203 flame retardant topcoat, provides a highly water-resistant topcoat surface without the use of wax or Scothgard$_{TM}$. This chemical is commercially available from FRC Pyrotech in Addison, Ill.

The top surface [227] of the base member [220] preferably includes upwardly-extending ridges [233], the ridges [233] having a slight grade extending downwardly toward the pad-retaining compartment [250]. The nonabsorbent flat member [270] is retained within an inwardly extending lip [248] disposed about the perimeter of the rearward portion [224] so that any moisture deposited upon a non-absorbent flat member [270] will gravitate toward the pad-retaining compartment [250] of the base member [220]. The upwardly retaining ridges [233] are almost parallel to each other, being closer together at the rear edge [211] of the base member [220] and separating slightly. The nonabsorbent flat member [270] is positionable upon the upwardly-extending ridges, the forward extending portion of the nonabsorbent flat member [270] abutting the disposable nonabsorbent pad [230]. The nonabsorbent flat member [270] is replaced periodically along with the disposable nonabsorbent pad [230].

Figure 8A:
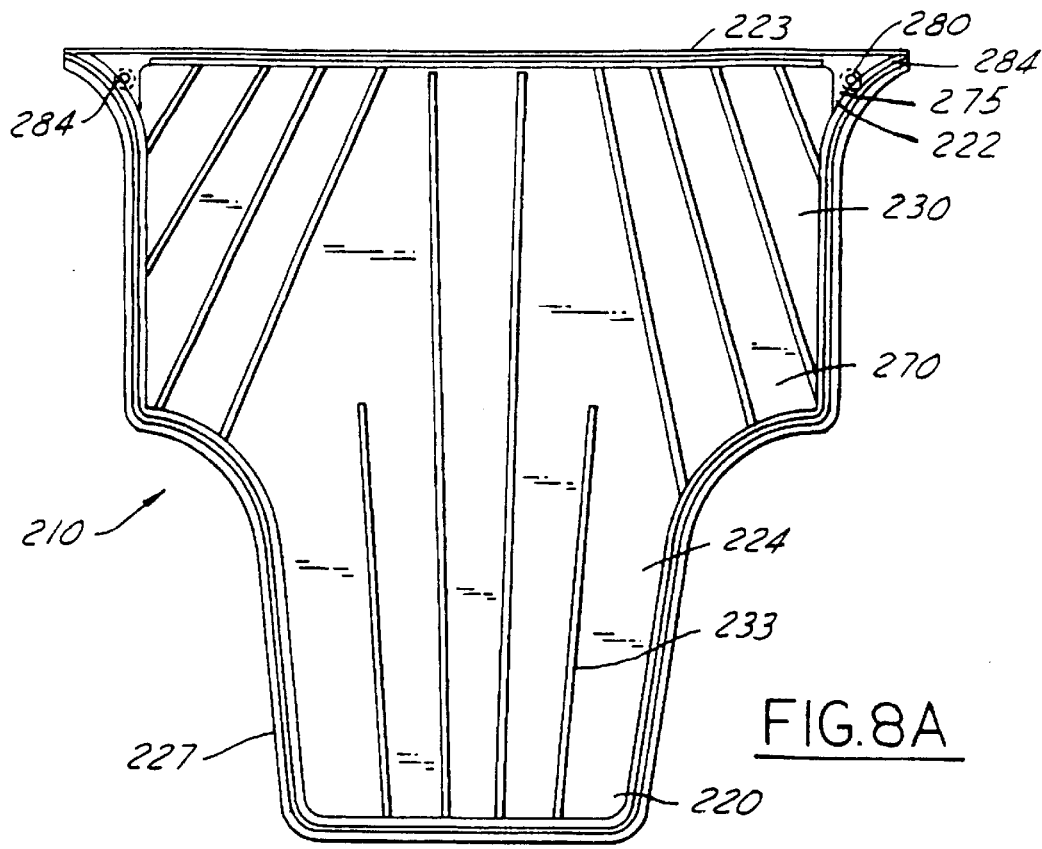
FIG. 8A is a top view of yet another preferred embodiment of the floor mat system of the present invention for use with a conventional urinal.

FIG. 8A depicts yet another configuration of the base member [220'] wherein the there are four parallel tracks extending from the rearward edge [224] towards the forward edge [223]. In addition, there are a set of four tracks on each side of the center one set extending from the right side wall to the forward edge, and the other set extending from the left sidewall to the forward edge [223]. Each set of side tracks extend at an angle of between 45 to 65 degrees from the forward edge [223]. The side sets of tracks direct the flow of moisture toward the forward edge [223].

Figure 11:
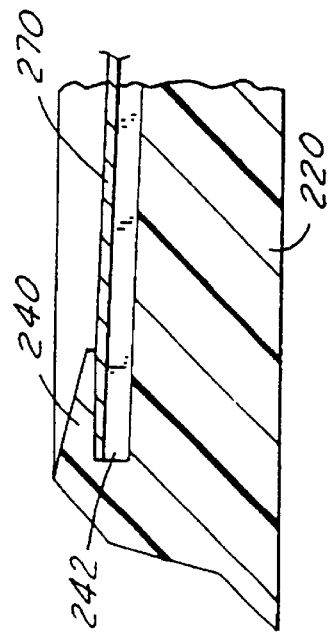
FIG. 11 is an exploded assembly view of the floor mat system of FIG. 8, detailing the cooperative engagement between upwardly extending floor projection and the bore disposed on the underside of the floor mat.
Figure 12:
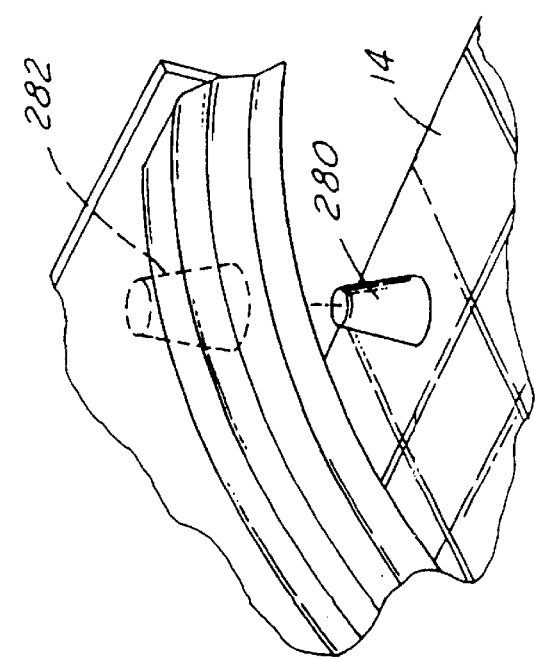
FIG. 12 is an exploded side detail of the floor mat system of FIG. 8, detailing the bore disposed on the underside of the floor mat.

Turning now to FIGS. 11 and 12, a pair of spaced apart projections [280] that extend upwardly are secured to the floor [14], either by an adhesive or by conventional fasteners. Each floor projection [280] is in the general shape of a truncated cylinder. The floor projections [280] enable the placement of the base member [220] in the same position relative to the urinal, and further enhance the skid resistance of the base member [220]. The base member [220] is made of non-skid materials, such as plastic or rubber.

Each end [284] of the forward edge [221] of the underside of the base member [220] includes a spaced apart bore [282] being in the general shape of a truncated cylinder. The projections [280] are cooperatively retainable within the bores [282] to serve as a locking device and position the base member [220] relative to each urinal. Each end [284] of the forward edge of the base member [220] extends outwardly away from the parallel side edges of the base member [220], the bores [282] being disposed within each outwardly extending end [284] of the base member [220] for cooperative engagement with the floor projections [280].

The disposable absorbent pad [230] is positioned within the forward compartment [250] of the base member [220]. A gap [275] extends between the underside of the disposable absorbent pad [230] and the base member [220] along the forward perimeter [242] of the base member [220] enabling the disposable absorbent pad [230] to be lifted from the base member [220] and easily replaced. A super-absorbent polymer, clay (cat litter), corn cob fiber, cellulose (shredded and recycled newspaper), or any other material described relative to the other embodiments is used as the absorbent material in the absorbent pad [230]. The recycled paper is processed with a noncombustible chemical, making the disposable absorbent pad [230] flame retardant. The nonabsorbent flat member [270] and the absorbent pad [230] are biodegradable and flame retardant.

Figure 13:
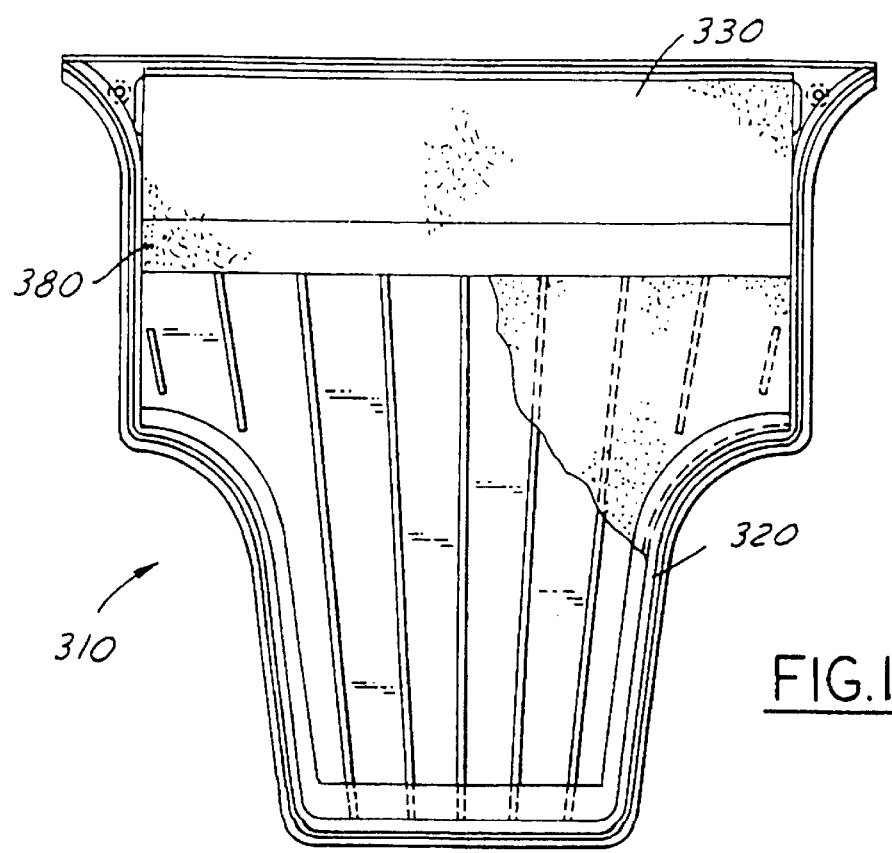
FIGS. 13 and 14 disclose another preferred embodiment of the floor mat system of the present invention, further comprising an overlay mat that attaches to the absorbent pad and the nonabsorbent flat member, the overlay mat preventing the splashing or spillage of liquid onto the floor portion.
Figure 14:
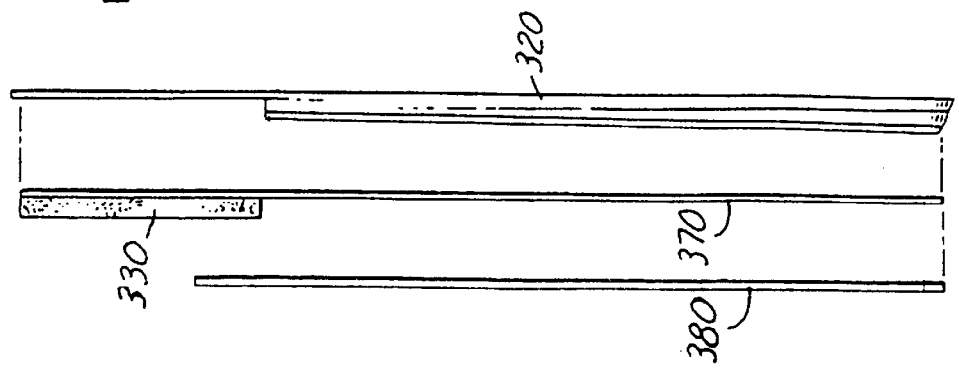

FIGS. 13 and 14 disclose another preferred embodiment of the floor mat system [310] of the present invention, further comprising an overlay mat [380] that attaches to the absorbent pad [330] and the nonabsorbent flat member [370]. The overlay mat [380] minimizes the splashing or spillage of moisture onto the floor portion [14]. The overlay mat [380] is a high loft polyester bat material that covers the nonabsorbent flat member [370] and the front narrow portion of the absorbent pad [330]. The overlay mat [380] is generally the same shape as the base member [320]. The overlay mat [380] is either bonded or melted onto the nonabsorbent flat member [370].

Figure 16:
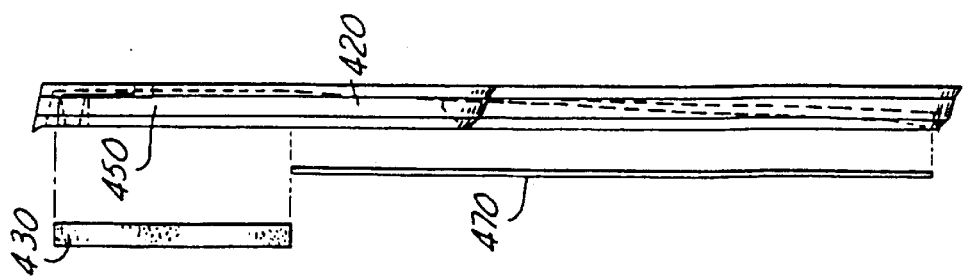
FIGS. 15 and 16 disclose another preferred embodiment of the floor mat system of the present invention for use with a conventional urinal.
Figure 15:
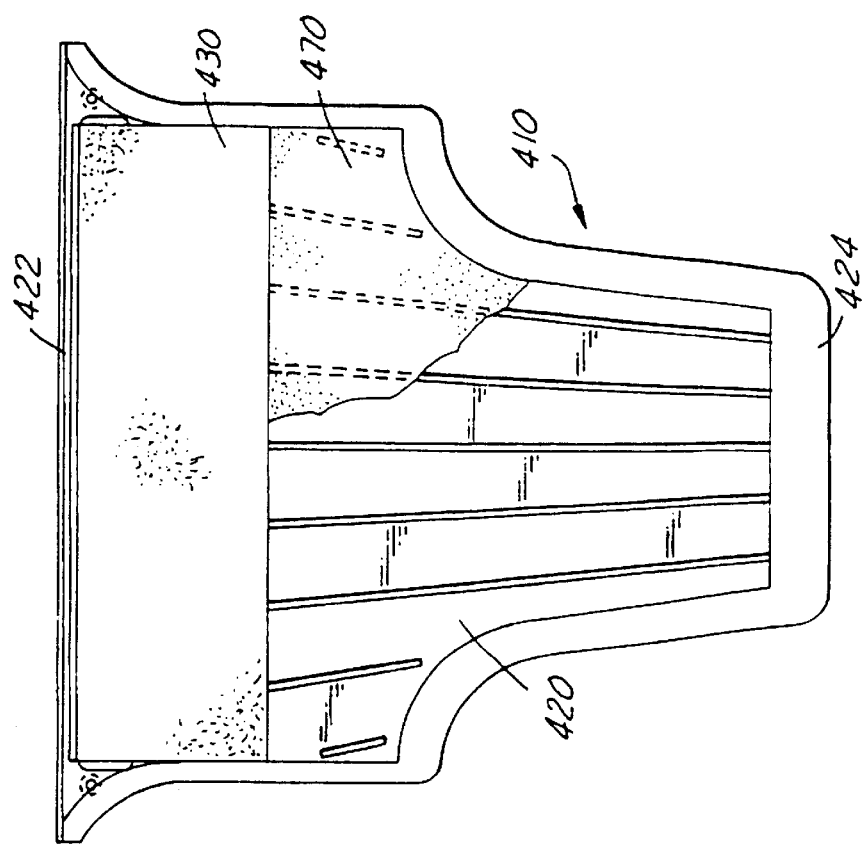

FIGS. 15 and 16 disclose another preferred embodiment of the floor mat system [410] of the present invention for use with a conventional urinal. The disposable pad [420] comprises only a narrow strip of absorbent material similar to a feminine napkin. The rearward narrower portion [424] is higher than the forward wider portion [422], the rearward portion [424] having a slight grade and extending downward toward the pad-retaining compartment [450] directing moisture to flow into the absorbent pad [430].

Figure 18:
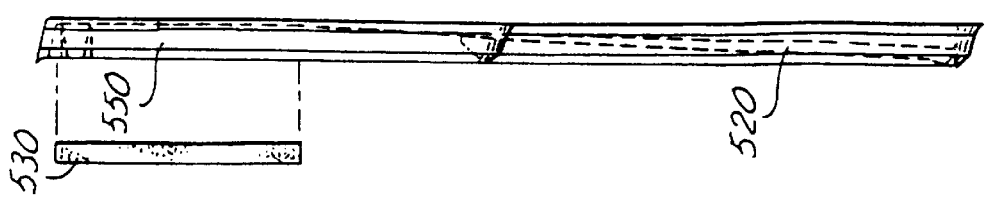

FIGS. 17 and 18 disclose yet another preferred embodiment of the floor mat system [510] of the present invention. There is no the lip in this embodiment extending about the outer perimeter of the base member [520] but rather the perimeter is relatively smooth and flat. This will lower the overall height of the base member [520], so as to reduce the likelihood of stumbling. The rearward narrower portion [524] is still includes a slight grade and extending downward toward the pad-retaining compartment [550].

Figure 23:
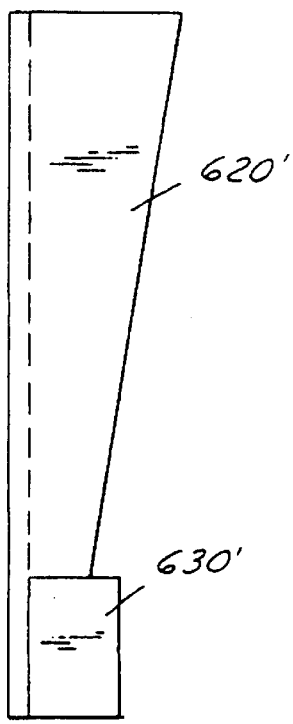
FIGS. 23 and 24 disclose another embodiment of a disposable floor mat of the present invention for use with a conventional urinal, the floor mat being generally in the shape of a hand fan, the tracks folding for complete storage and disposal.
Figure 24:
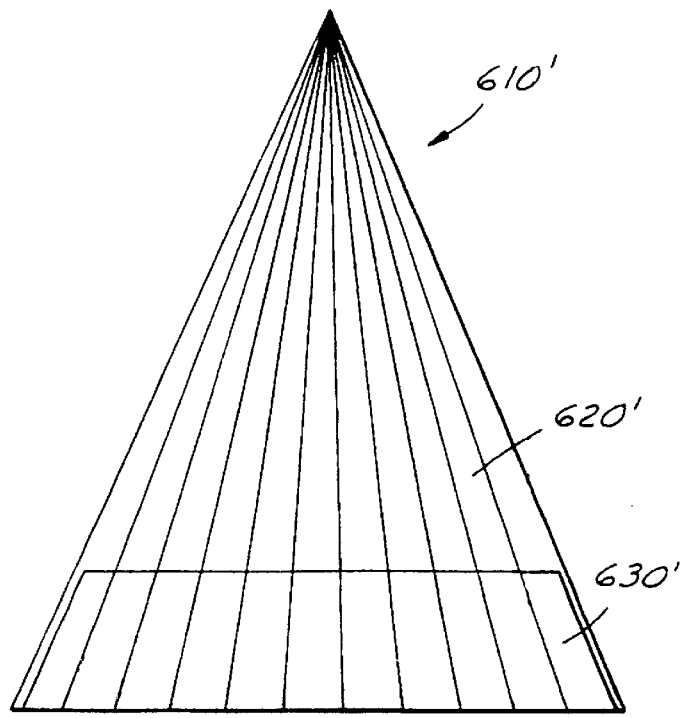

Other embodiments comprise an absorbent pad [620] secured to a base member [630], making the system one unit [610]. Each unit [610] is disposed and replaced every twenty-four hours. FIGS. 19 and 20 disclose a first embodiment of a disposable floor mat unit [610] of the present invention for use with a conventional urinal, the floor mat unit [610] being generally in the shape of an unfolded box for purposes of compact storage. The rearward side flaps are taller than the forward side flaps. The side flaps may also be cut at an angle (not shown). FIGS. 23 and 24 disclose a second embodiment of a disposable floor mat unit [610'] of the present invention for use with a conventional urinal, the floor mat [610'] being generally in the shape of a hand fan, the tracks [633'] folding for complete storage and disposal.

A claw-type device (not shown) may also be used to remove the absorbent pad and chipboard, so as to minimize human contact. This claw-type device ensures compliance with OSHA-Bloodborn Pathogen Laws (29 CFR).

Preferably, tracks [633] are formed in the unit [610], extending from the narrower edge [621] to the wider edge [623]. The moisture will tend to fall onto the unit [610], with a heavier concentration distributed outwardly on both sides. The tracks [633] are formed either into the base member [620] or formed by a wax design. Tracking may also be useful in the absorbent pad (not shown). To move the moisture toward the absorbent pad [630], the unit [610] is embossed which will produce wicking. Wicking liquid tends to follow the higher density tracks [633], pulling or drawing the moisture toward and into the absorbent pad [620]. Another option is to use a corrugated base member, securing the absorbent pad [620] to the corrugated base member.

Figure 21:
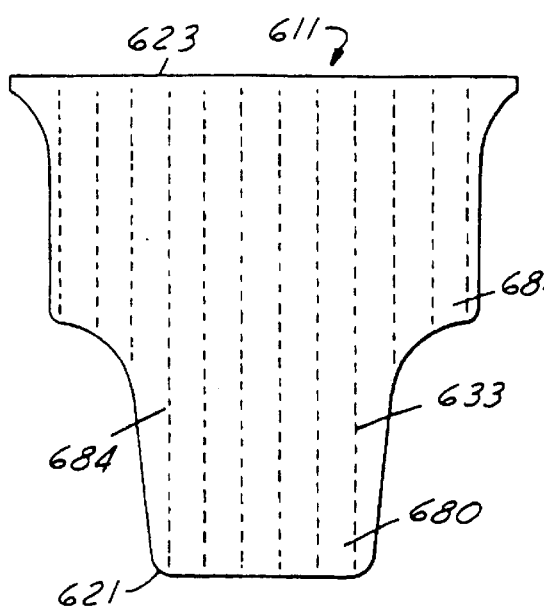
FIG. 21 is a top view disclosing an embossing configuration within the overlay pad that produces wicking tracks.
Figure 22:
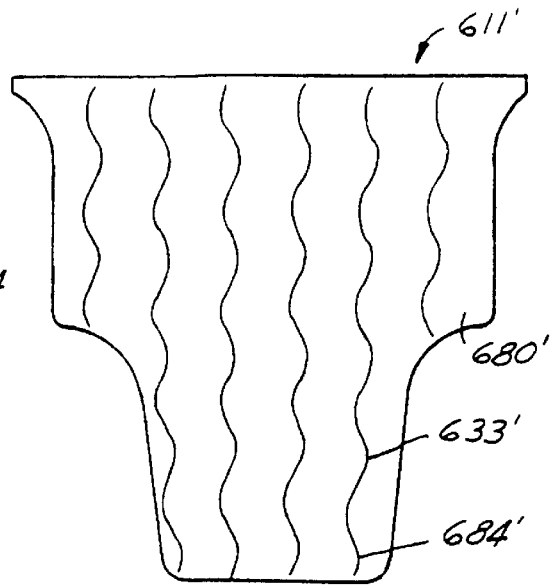
FIG. 22 is a top view disclosing an overlay pad that includes a plurality of serpentine tracks that are essentially parallel to each other, extending from the narrower edges to the wider edge.

FIG. 21 is a top view disclosing a preferred embodiment of an embossing configuration within the overlay pad [680] that produces wicking tracks [682]. FIG. 22 is a top view disclosing another preferred embodiment of an overlay pad [680] that includes a plurality of serpentine tracks [684] that are essentially parallel to each other, extending from the narrower edges [621] to the wider edge [623]. The top surface [627] of the unit [610] is waxed prior to attachment to the absorbent pad [630]. The bottom surface [624] is skid resistant with lok-lift™ strips commercially available from the R.C. Musson Rubber Company of Akron, Ohio.

Also, lighter colors or earth tones are used for the absorbent pad, the nonabsorbent layer and the overlay mat in all of the various embodiments. Light brown, gold, light blue, or gray are recommended.

The systems of the present invention have numerous other uses in other environments including around wash basins, bath tubs, showers, locker rooms, and the like where bacteria, odors, and moisture are involved, and cross-contamination is a problem. The systems are also useful in protection from slippage. Also, the principles of the present invention have numerous other applications; such as for use with household pets, and in factories in conjunction with heavy-duty machinery.

Microban™ is applied to the mat to prevent the growth of bacteria and germs in the plastic base member. Microban™ is located in Montreal, Canada.

The absorbent pad will tuck under the chipboard during manufacture to enable a better retention between the pad and the chipboard. This tuck under method is enhanced by a hot melt process, using an adhesive, such as glue or hot wax, to securely retain the absorbent pad to the chipboard.

Other uses of the system of the present invention include restrooms in commercial aircraft, portable toilets, toilets in recreational vehicles, motorhomes, and commercial buses, jail cells, pet carriers, and kennels.

It is evident that many alternatives, modifications, and variations of the floor mat system of the present invention will be apparent to those skilled in the art in light of the disclosure herein. It is intended that the metes and bounds of the present invention be determined by the appended claims rather than by the language of the above specification, and that all such alternatives, modifications, and variations which form a conjointly cooperative equivalent are intended to be included within the spirit and scope of these claims.

What is claimed is:

1. A system for maintaining a portion of a floor beneath a urinal in a restroom in sanitary condition, the urinal being secured to a restroom wall above the floor portion, the system comprising:

(a) a pad member having a plurality of layers including at least one layer of a highly absorbent material; and (b) a base member positioned beneath the pad member and upon the floor portion, the base member being made of an impermeable material, a forward portion of the base member being configured for placement against the restroom wall to position the system to cover the floor portion beneath the urinal, a rearward portion of the base member opposing the forward portion of the base member, the rearward portion of the base member being narrower than the forward portion of the base member enabling a user of the urinal to assume a straddling position of the narrower portion of the base member when using the urinal and position both feet upon the floor proximate to the rearward portion of the base member rather than upon the base member, the rearward portion of the base member extending upto and beneath the user of the urinal, the forward portion of the base member protecting the floor portion beneath the urinal from fluid, the rearward portion of the base member protecting the floor portion beneath the user of the urinal from fluid, the base member having a substantially horizontal upper surface for receiving the pad member when the pad member exhibits a shape similar to the base member, the base member having an upstanding peripheral portion with an attached beveled edge to prevent tripping of the user.

2. The system of claim 1, wherein the pad member is generally T-shaped having a stem section and a crosspiece, the crosspiece for placement beneath the urinal, the stem extending beyond the urinal to an area assumed by a user of the urinal enabling the user to assume a straddling position relative thereto.

3. The system of claim 1, wherein the base is fixed and the pad member is disposed upon the upper surface of the base member, the disposable pad member extending beneath the urinal, the soiled disposable pad member being periodically replaceable upon the fixed base member and replaced with another disposable pad without moving the base member.

4. The system of claim 1, wherein the base member has a grade such that when the base member is disposed upon an inclined floor beneath the wall urinal in the restroom, liquid disposed upon the rearward portion of the pad member tends to gravitate to the forward portion of the pad member.

5. A system that is useful in keeping a floor portion beneath a wall-mounted urinal in sanitary condition, the system comprising:

(a) a base member being made of an impermeable material, the base member having a top surface and a bottom surface, the base member having a substantially flat upper surface for positioning of a pad member, the base member being affixed to the floor; and (b) the pad member having a plurality of layers including a layer made of a highly absorbent material, the pad member being disposable, the pad member being positioned upon the uppermost surface of the base member, the soiled disposable pad member being periodically replaceable upon the fixed base member and replaced with another disposable pad without moving the base member;

wherein the base member and pad member are generally T-shaped having a stem section and a crosspiece, the crosspiece being disposed against the wall for placement beneath the urinal, the stem section extending beyond the urinal to an area assumed by a user of the urinal enabling the user of the urinal to assume a straddling position relative thereto.

6. The system of claim 5, wherein the base member has an upstanding peripheral portion with an attached beveled edge to prevent tripping of the user when the pad member exhibits a shape similar to that of the base member.

7. The system of claim 5, wherein the base member has a grade such that when the base member is disposed upon an inclined floor beneath the wall urinal in the restroom, liquid disposed upon the rearward portion of the pad member tends to gravitate to the forward portion of the pad member.

* * * * *